United States Patent
Tsao et al.

(10) Patent No.: US 8,142,880 B2
(45) Date of Patent: Mar. 27, 2012

(54) HOUSING FOR ELECTRONIC DEVICE, MOLD FOR MAKING THE HOUSING, AND METHOD FOR MAKING THE HOUSING

(75) Inventors: Ben-Ding Tsao, Taipei Hsien (TW); Wen-Lin Xiong, Shenzhen (CN); Qi-Quan Yan, Shenzhen (CN); Yue-Jun He, Shenzhen (CN); Man-Xiang Duan, Shenzhen (CN); San-Yuan Wen, Shenzhen (CN)

(73) Assignees: Shenzhen Futaihong Precision Industry Co., Ltd., ShenZhen, Guangdong Province (CN); FIH (Hong Kong) Limited, Kowloon (HK)

( * ) Notice: Subject to any disclaimer, the term of this patent is extended or adjusted under 35 U.S.C. 154(b) by 12 days.

(21) Appl. No.: 12/634,800

(22) Filed: Dec. 10, 2009

(65) Prior Publication Data

US 2010/0279073 A1 Nov. 4, 2010

(30) Foreign Application Priority Data

May 4, 2009 (CN) .......................... 2009 1 0302095

(51) Int. Cl.
- *B32B 3/00* (2006.01)
- *B32B 3/28* (2006.01)
- *B32B 3/30* (2006.01)
- *H05K 5/00* (2006.01)
- *H05K 7/00* (2006.01)

(52) U.S. Cl. ... 428/172; 428/167; 428/156; 361/679.01; 361/679.02

(58) Field of Classification Search ............... 428/141, 428/142, 156, 167, 172, 195.1, 203, 204, 428/913.3, 187; 343/872; 361/679.01, 679.02; 264/505, 259, 271.1, 320, 325

See application file for complete search history.

(56) References Cited

U.S. PATENT DOCUMENTS 7,090,910 B2 * 8/2006 Courtoy et al. ............... 428/158

FOREIGN PATENT DOCUMENTS

| JP | 54-145759 A | | 11/1979 |
| JP | 5-42937 B2 | | 6/1993 |
| TW | 200911564 A | * | 3/2009 |
| TW | 200911564 A | | 3/2009 |

OTHER PUBLICATIONS

Lewis, Richard J., Sr., Hawley's Condensed Chemical Dictionary, John Wiley & Sons, 15th Edition, 2007, p. 1008.*

* cited by examiner

*Primary Examiner* — Catherine A Simone

(74) *Attorney, Agent, or Firm* — Altis Law Group, Inc.

(57) ABSTRACT

A housing for an electronic device is disclosed, the housing comprises a base layer and a transparent film layer overlapped in the base layer, the film layer includes an inner surface abutting the base layer and an outer surface having ridges protruding therefrom. The housing is formed by injection molding a molten plastic material over the transparent film layer, the ridges are formed on the transparent film layer by the molten plastic pressing the transparent film layer in injection molding. It is also disclosed a mold for making the housing and a method to make the housing.

1 Claim, 3 Drawing Sheets

HOUSING FOR ELECTRONIC DEVICE, MOLD FOR MAKING THE HOUSING, AND METHOD FOR MAKING THE HOUSING

BACKGROUND

1. Technical Field

The present disclosure generally relates to housings for electronic devices, more particularly, to a housing for an electronic device, a mold for making the housing, and a method for making the same.

2. Description of Related Art

Currently, portable electronic devices with wireless communication capability, such as mobile phones, are widely used. Consumers often select a portable electronic device with good quality and an attractive appearance. A typical method for making an attractive housing for the portable electronic device is the In-Mold Labeling (IML) process. The process is carried out by molding a plastic substrate to combine with a plastic film in a mold. Before molding, a pattern is printed on the plastic film. After the molding, the pattern is sandwiched between the film and the molded plastic substrate and thus protected from erosion.

In order to further improve the appearance of housing additional steps such as polishing the outer surface and drawing or forming decorations on the surface are needed, which increases time and cost of manufacture.

Therefore, there is room for improvement within the art.

BRIEF DESCRIPTION OF THE DRAWINGS

Many aspects of the disclosed the housing for electronic device, mold for making the housing and method for making the housing can be better understood with reference to the following drawings. These drawings are not necessarily drawn to scale, the emphasis instead being placed upon clearly illustrating the principles of the exemplary embodiment. Moreover, in the drawings like reference numerals designate corresponding parts throughout the several views. Wherever possible, the same reference numbers are used throughout the drawings to refer to the same or like elements of an embodiment.

DETAILED DESCRIPTION

Figure 1:
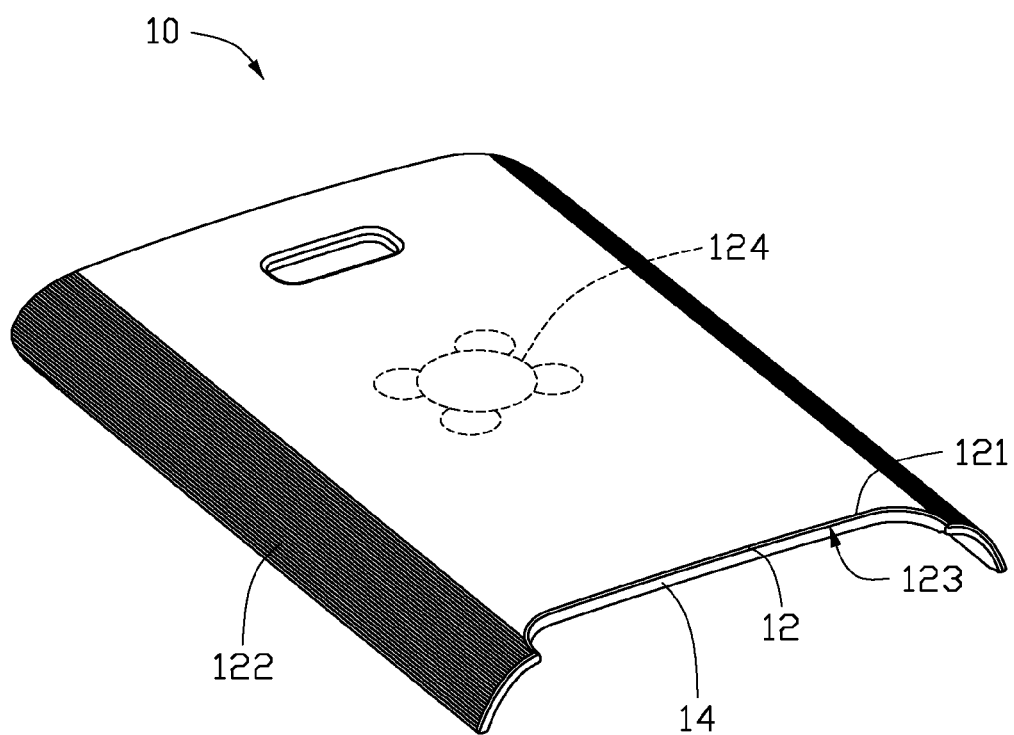
FIG. 1 is schematic view of an exemplary embodiment of a housing for an electronic device.

FIG. 1 shows an exemplary housing 10 suitable for an electronic device such as a mobile phone, portable computer, and other devices. The housing 10 formed by injection molding includes a film layer 12 covering a base layer 14. The film layer 12 is transparent and can be made of thermoplastic macromolecular material such as polycarbonate, polyethylene terephthalate, or a combination thereof. The film layer 12 has an outer surface 121 exposed to the outside and an inner surface abutting the base layer 14. The outer surface 121 may have a plurality of decorative ridges 122 protruding therefrom, the inner surface 123 may a pattern 124 printed thereon. Each ridge 122 follows a straight line and the ridges 122 are parallelly arranged on two sides of the film layer 12. The width of each ridge 122 is generally not more than about 0.1 mm (millimeter). The pattern 124 is not exposed to the outside and is thus protected. The base layer 14 is formed by a molten plastic material in molding and can be made by any one of materials such as PE (polyethylene), PA (polyamide), PC (polycarbonate), ABS (acrylonitrile butadient styrene), PMMA (polymethyl methacrylate) and PET (polyethylene terephthalate) etc.

Figure 2:
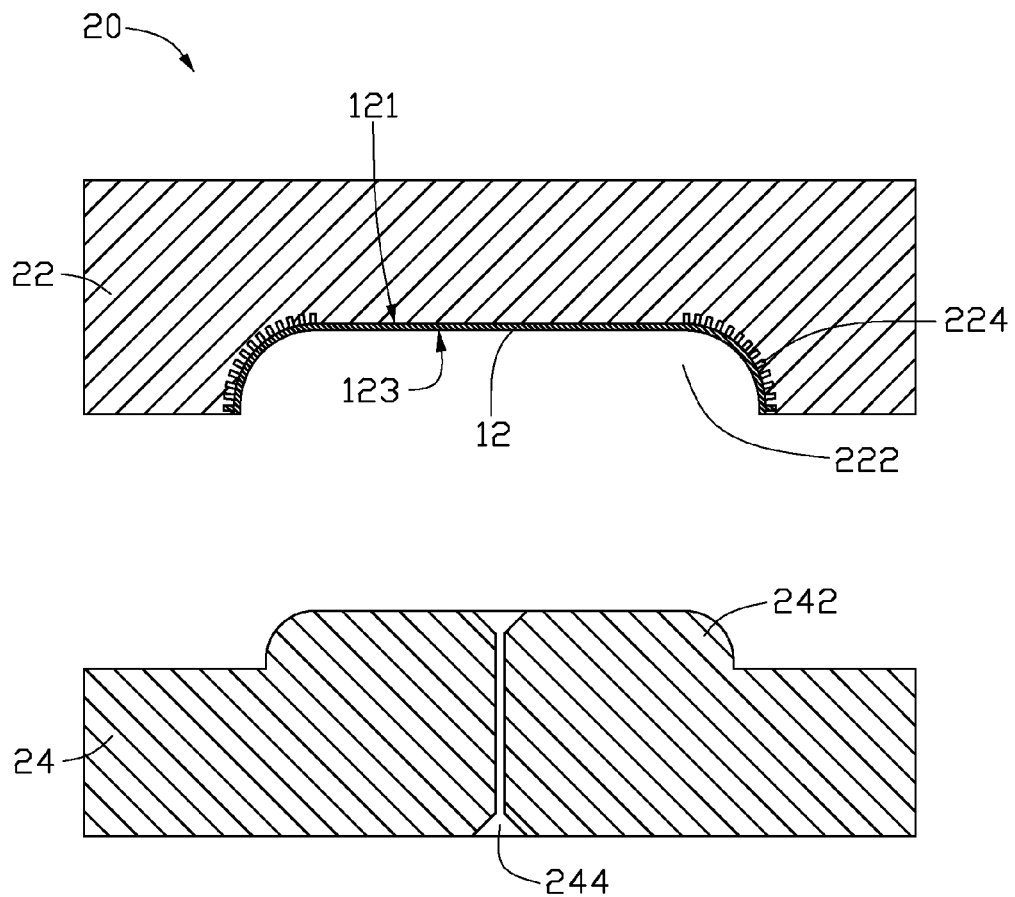
FIG. 2 is a sectional view of a mold for making the housing shown in FIG. 1.
Figure 3:
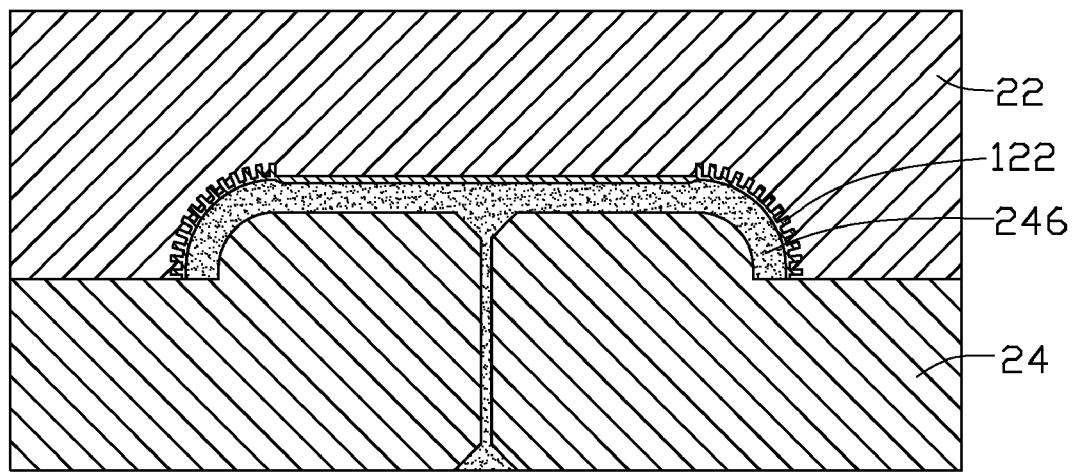
FIG. 3 is a schematic view of fabricating the housing applying the mold shown in FIG. 2.

Referring to FIG. 2 and FIG. 3, to make the housing 10, first provide a mold 20. The mold 20 includes a female plate 22 and a male plate 24 engagable with the female plate 22. The female plate 22 defines a cavity 222. A plurality of striation recesses 224 are defined in the female plate 22. Each striation recess 224 is straight-line and the striation recesses 224 are arranged adjacent to two sides of the cavity 222. The width of each striation recess 224 is not more than about 0.1 mm (millimeter). The male plate 24 forms a core 242 to correspond with the cavity 222 of the female plate 22. The male plate 24 defines a molding path 244 running through the outside surface and the core 242. The molding path 244 guides the molten plastic material into the cavity 222.

A film layer 12 is provided, having a pattern 124 printed on a surface thereof. The film layer 12 is processed by hot pressing and cut to have a shape engagable with the cavity 222. The film layer 12 is placed into the cavity 222 with the surface not having the printed pattern 124 abutting the bottom surface of the cavity 222.

The mold 20 is closed with the male plate 24 engaging with the female plate 22 and the core 242 reaching into the cavity 222. A chamber 246 is thus formed corresponding in shape and size to the base layer 14. Then, a molten plastic material is injected through the molding path 244 into the chamber 246. The incoming molten plastic material presses part of the film layer 12 into the striation recesses 224. Accordingly, a plurality of ridges 122 corresponding to the striation recesses 224 are formed. The molten plastic material integrally combines with the film layer 12 and cools to form the base layer 14. The housing 10 is thus formed and removed after the mold 20 is open.

It is to be understood, to securely interlock the film layer 14 with the base layer 12, the film layer 14 can be attached with an adhesive layer (not shown) on the surface having the pattern 124 before molding.

By molding the ridges 122, steps are saved in decorating the housing which reduces time and cost of manufacture.

It is to be understood that even though numerous characteristics and advantages of the present embodiments have been set forth in the foregoing description, together with details of structures and functions of various embodiments, the disclosure is illustrative only, and changes may be made in detail, especially in matters of shape, size, and arrangement of parts within the principles of the present disclosure to the full extent indicated by the broad general meaning of the terms in which the appended claims are expressed.

What is claimed is:

1. A housing for an electronic device, comprising:
   a base layer made of a material;
   a transparent film layer covering and connecting the base layer and including an inner surface abutting the base layer and an outer surface having straight ridges protruding therefrom;
   wherein portions of the material of the base layer deflect portions of the transparent film layer to form the straight ridges, the width of each ridge not more than about 0.1 mm, and the ridges parallelly arranged on two sides of the film layer.

* * * * *